United States Patent

[11] 3,597,964

| [72] | Inventors | Helmut Heine<br>Herrsching, Upper Bavaria, Germany;<br>Joergen Bruun Jensen, Slagelse, Denmark |
|---|---|---|
| [21] | Appl. No. | 800,192 |
| [22] | Filed | Feb. 18, 1969 |
| [45] | Patented | Aug. 10, 1971 |
| [73] | Assignee | Optotechnik G.m.b.H. and Propper<br>Manufacturing Company Inc. |
| [32] | Priority | Mar. 8, 1968 |
| [33] | | Germany |
| [31] | | P 16 16 896.0 |

[54] DEVICE FOR TESTING BY APPLANATION
3 Claims, 3 Drawing Figs.
[52] U.S. Cl. .................................................. 73/80
[51] Int. Cl. ..................................................... A61b 3/16
[50] Field of Search ........................................... 73/80, 52;
128/2; 88/1.5

[56] References Cited
UNITED STATES PATENTS

| 3,070,997 | 1/1963 | Papritz .......................... | 73/80 |
| 3,248,934 | 5/1966 | Matalene....................... | 73/80 |
| 3,301,131 | 1/1967 | Benford......................... | 73/80 |
| 3,379,092 | 4/1968 | Papke............................ | 88/1.5 |
| 3,470,736 | 10/1969 | Bartfay......................... | 73/80 |
| 3,282,090 | 11/1966 | Posner........................... | 73/80 |

FOREIGN PATENTS

| 1,012,573 | 12/1965 | Great Britain............... | 73/80 |

OTHER REFERENCES

" A Simple Applanation Tonometer" - E. S. Perkins - Transactions Of The Opthalmological Society Of The United Kingdom Volume 73 pp. 261— 66 -1953.

*Primary Examiner*—Richard C. Queisser
*Assistant Examiner*—C. E. Snee, III
*Attorney*—Blum, Moscovitz, Friedman & Kaplan ABSTRACT: A device for testing intraocular pressure by applanation. The device includes a testing body of precisely determined weight which has a bottom end surface adapted to rest directly on the cornea so that as the result of the weight of this testing body a flattened area will be provided between the bottom end surface of the testing body and the cornea. This testing body is held and guided in such a way that no appreciable frictional forces are encountered when it rests upon the cornea. By way of a suitable illuminating means and indicating means it is possible to view the flattened cornea area and to make a comparison which will determine whether or not the intraocular pressure deviates from a given normal value.

Patented Aug. 10, 1971  3,597,964
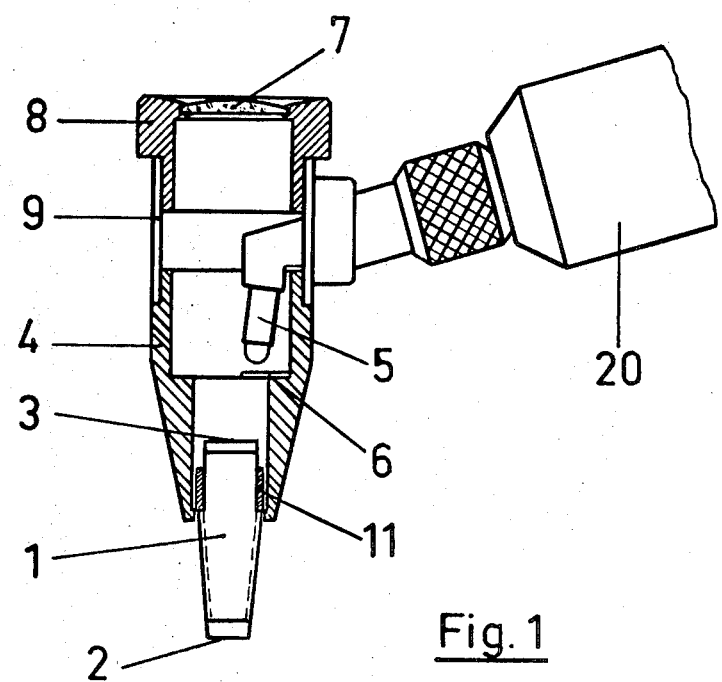
Fig. 1
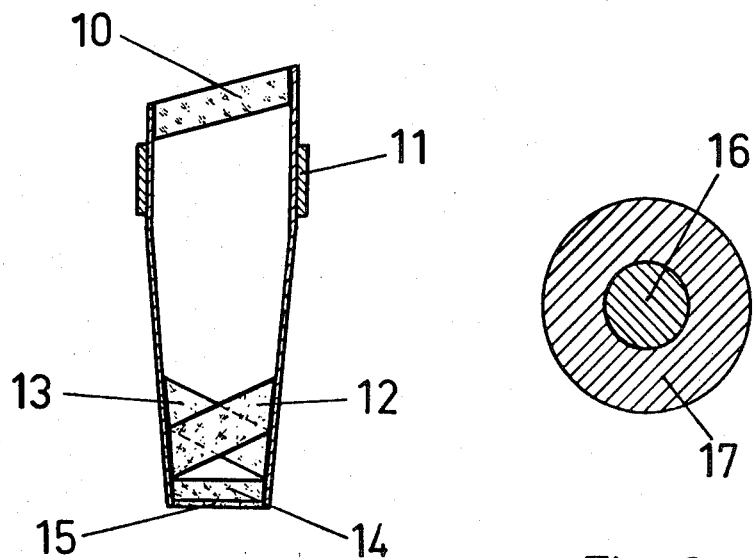
Fig. 2
Fig. 3

DEVICE FOR TESTING BY APPLANATION

BACKGROUND OF THE INVENTION

The present invention relates to a device for measuring the hydrostatic pressure of the human eye.

As has long been known, a determination of the intraocular pressure in the human eye is of extremely great significance in the diagnosis of glaucoma (green cataracts). Glaucoma is an illness which occurs fairly frequently. An early recognition of glaucoma or of the potential formation of a glaucoma is of extremely great importance, inasmuch as it is generally the case that an illness of glaucoma can not in general be improved, but it is merely possible to fix the progress of the illness at a stage where the medical treatment commences so that in this way it becomes possible to avoid to a very large extent any deterioration of the condition.

Without an early, timely treatment, glaucoma will with very great likelihood lead to blindness.

Very frequently, an early stage of glaucoma does not result at first in a pronounced disturbance of the capability of the patient to use his eyes. Instead these early stages result only in general symptoms of illness. Thus, a patient very often will not initially seek out the services of an ophthalmologist. Instead, a patient will consult a general practitioner, for example. This latter physician will only recommend consultation of a specialist in the event that it is possible for the general practitioner to check in an objective manner as to whether or not the symptoms of glaucoma are present or at least the danger of an oncoming glaucoma, so that in this way the specialist can make a definite diagnosis. In this way it would be possible to substantially reduce the number of cases in which glaucoma is treated too late.

Presently known instruments available to the general practitioner for such purposes have serious disadvantages and cannot provide a reliable check for the presence of an oncoming glaucoma.

The most widely used instrument for measuring intraocular pressure is the Schiotz tonometer. Devices of this type have an inherent source of error resulting from the relatively large volumetric compression of the measuring instrument, this latter compression being between 6 and 30 $\mu$l. As a result there is not inconsiderable influence on the measuring results because of the "stiffness," which is to say because of the elastic properties of the cornea. Moreover, the curvature of the cornea, which is different with different individuals, also has an influence on the measuring results achieved by the Schiotz tonometer. Finally, this tonometer is of high mechanical sensitivity so that it cannot be used efficiently by physicians who are not skilled and trained in the use of the instrument.

In order to avoid these disadvantages of the Schiotz tonometer, it has already been proposed for a long time to use a so-called planing tonometer. With this type of instrument a measurement is made of the extent to which the cornea is flattened, in the case where a flat, plane surface engages the cornea with a predetermined force, so that it becomes possible to determine the magnitude of the force required in order to achieve a flattened cornea area of given diameter. A tonometer of this type is described, for example, in German Patent 559,952.

A construction of this latter type, however, has also not proved to be of practical utility because of the requirement of making use of a spring force in order to achieve a measurable force at the tonometer. Thus, devices of this type can only be used when they are maintained stationary, which is to say, in an arrangement where on one hand the head of the patient is fixed in a suitable head support and on the other hand the instrument, in this case the tonometer, is fastened on a suitable stand in this way brought into engagement with the eye. Thus, it is necessary to fix the adjustment at which the flat surface of the testing device engages the cornea of the patient and in this latter position where the testing device just touches the cornea it is necessary to zero the spring force. Only then can the spring force be increased so as to be measured until a predetermined diameter of the planar area is achieved. Between this pair of adjusting points it is essential that neither the crest of the cornea of the patient nor the position of the instrument change to the least extent.

Thus, it is clear that this latter instrument also is not suited for general utility by a relatively unskilled general practitioner.

There are also known tonometers which require a stationary operation. In German Patent 1,113,285, for example, such a stationary planing tonometer is described. For the purpose of accurately measuring the intraocular pressure, as is required for the eye doctor to diagnose glaucoma and for the continuous checking of the progress of therapy, instruments of this type are indeed of some practical value. An essential requirement, however, is that the patient is not confined to his bed, but instead is in a position to travel to the consultation chamber of the eye doctor. The measurement of the intraocular pressure by way of the measuring of the force which is required to achieve a given planar area of the cornea takes place in German Patent 1,113,285 by the tonometer described therein with the use of a split lamp microscope. Therefore, devices of this type are only to be found at the establishment of a specialist in the treatment and curing of eye illnesses, and under no circumstances at the establishment of a general practitioner, or an internist or the like. A device of this type thus is not suited for a solution to the problem.

SUMMARY OF THE INVENTION

It is, accordingly, a primary object of the invention to provide a device capable of measuring the hydrostatic pressure in the human eye while at the same time being of a simple construction which is easy to handle.

Thus, it is an object of the invention to provide a suitable, easy-to-operate instrument which gives a physician who does not specialize in eye illnesses the possibility of easily determining whether or not there is any danger of glaucoma.

In other words, it is an object of the invention to provide a device of this type which gives the possibility of determining in a reliable manner whether the intraocular pressure is within a normal range or whether this pressure has already exceeded a normal value of intraocular pressure.

Also, it is an object of the invention to provide a device which will make it easy to determine whether the intraocular pressure of both eyes is approximately equal or if, instead, this pressure has an elevated value on one side.

Thus, it is among the objects of the invention to achieve a construction which will avoid the disadvantages of known relatively simple instruments while at the same time avoiding the high costs of the complicated structures of instruments of the type used by specialists, so as to provide economically the possibility for the widest possible careful checking for glaucoma.

It is also an object of the invention to provide a tonometer which operates according to the planing principle while at the same time maintaining the advantages of this type of operation with respect to a small extent of volumetric compression and with respect to maintaining a negligible influence of the elastic properties of the cornea, while achieving a highly satisfactory measurement of the intraocular pressure and a determination as to whether this pressure is above a critical value, with these results being achieved by way of simple manipulations and without any danger to the eye of the patient.

Moreover, it is an important object of the invention to provide a relatively inexpensive instrument which can readily be purchased throughout a wide circle of general practitioners, internists, neurologists, and the like, so that it will become possible in this way to achieve a much earlier recognition of glaucoma in a far greater number of cases than has heretofore been possible.

According to the invention, the device for determining the intraocular pressure according to a planing principle, or in other words by applanation, includes a testing body of precisely predetermined weight which has a central axis and which is transparent in the region of its central axis, this body having a bottom end surface adapted to rest directly on the cornea and this bottom end surface is optically flat. A holding means coacts with this testing body to hold and guide in such a way that when the axis of the testing body is vertical there is between the holding means and the testing body a force of friction so small that in comparison to the weight of the testing body this friction is of no significance whatever. In addition, a light source is provided to illuminate the upper end surface of the testing body and the transparent part thereof which is in the region of its axis so that in this way it becomes possible to illuminate the area of engagement between the bottom end surface of the testing body and the cornea. This latter area is visible along a given line of sight, and on this line of sight is located a magnifying means for providing a magnified image of the area of contact between the testing body and the cornea, so that the peripheral configuration of this latter area will be clearly visible. Finally, an indicating means is provided, also along the line of sight, to indicate whether or not this area has characteristics which show that a given value of intraocular pressure has been exceeded.

One of the basic concepts of the invention resides in the recognition of the fact that by testing the intraocular pressure with a constant force, which acts on the flat surface of the testing body which brings about the flattening or planing, it becomes possible to determine the size of the flattened area or the length of the peripheral edge thereof, and where this edge is circular or approximately circular it can be determined whether the diameter of the flattened area of contact between the testing body and the cornea corresponds to the diameter which would be achieved with an intraocular pressure which is perfectly normal so that there would be no indication of any possibility of glaucoma.

According to the invention, this constant force is provided by way of the weight of the testing body itself, so that in this way there is an elimination of all sources of error which occur when using spring balances in any form.

Of course, one of the requirements of the use of the principle of the present invention is that the patient, during examination, must be brought into a position where the tangent to the crest of the cornea extends horizontally. However, this latter requirement is easily fulfilled inasmuch as when the patient is seated on an examination stool his head can be tilted back and his eyes can be directed vertically upward. Of course, it is also possible simply to place the patient on an examination table, bed or the like. In a case where the patient is confined to bed, these requirements, of course, are fulfilled without any difficulty.

BRIEF DESCRIPTION OF DRAWINGS

The invention is illustrated by way of example in the accompanying drawings which form part of this application and in which:

FIG. 1 is a schematic partly sectional elevation of one embodiment of the invention;

FIG. 2 shows, at an enlarged scale as compared to FIG. 1, another embodiment of a testing body which may be used with the structure of FIG. 1;

FIG. 3 is a schematic representation of an indicating means to indicate whether or not a normal intraocular pressure has been exceeded.

DESCRIPTION OF PREFERRED EMBODIMENTS

Referring now to FIG. 1, the testing body 1 which is shown therein is made, at least along the region of its vertical central axis of a transparent material such as plastic, glass, or a combination of both of these materials. Of course, the testing body need not be made of a solid block of material but can instead be of a tubular configuration. Thus, as is apparent from FIG. 1, the testing body 1 can have an upper cylindrical end portion and a lower tapering elongated portion, and suitable closure discs can be carried by the hollow tube of the testing body to close the upper and lower ends thereof. This is the construction of the testing body 1 which is illustrated in FIG. 1.

The bottom end surface 2 of the testing body is formed by a flat small plate which is glued to the exterior surface of the testing body at the lower end of its elongated tapered portion. In the same way, the upper end surface 3 is formed by a small, flat disc which also can be glued or adhered in any other suitable way to the exterior casing.

In accordance with the invention the testing body 1 is required to have a precisely determined weight so that the force with which the bottom end surface 2 presses against the cornea will be very accurately determined. During the manufacture of such testing body it is in general not simple and therefore expensive to very accurately maintain the weight in such a way that the requirements of the pressure-measuring process will be fulfilled.

Therefore, according to a further feature of the invention, the testing body 1 is surrounded by and includes a ring 11 of a suitable material such as aluminum or an aluminum alloy. This ring 11 is fixed to the testing body in any suitable way and serves to provide the entire testing body, including the ring 11 thereof, with a weight which will precisely correspond to the predetermined weight required to achieve the precisely determined pressure on the cornea. Thus, depending upon the particular weight of the testing body without its ring 11, this ring 11 is given in a very precise manner a weight which corresponds exactly to the difference between the desired weight and the weight of the body 1 without the ring 11, and in this simple way it is possible to achieve an exceedingly simple and inexpensive testing body of precisely determined weight.

A holding means 4 is provided for holding and guiding the testing body 1, and this holding means 4 is made of any suitable material. This holding means 4 which serves to hold and guide the body 1 is either integrally fixed with or removably connected to a primary component 9 of the instrument. An illuminating means 5 is situated in the primary component 9, and this illuminating means in the illustrated example takes the form of a lamp 5. Thus, by way of this lamp 5 it is possible to illuminate through the testing body 1 the flattened area of contact between the testing body and the cornea.

A magnifying means is located along the line of sight in order to magnify the image of the area of contact between the testing body 1 and the cornea. In the illustrated example this magnifying means included a magnifying lens 7 located along the line of sight which in this case coincides with the vertical central axis of the testing body 1, and this lens 7 is carried by a holder 8.

THus, the lens 7 will provide a magnified image of the flattened area of contact.

The primary component 9 itself may be made integral with or releaseably connected to a handle 20. This handle 20 at the same time serves to accommodate batteries for supplying the energy for the lamp 5. In addition, the handle 20 may accommodate a variable resistor which can be adjusted so as to regulate the brightness of the illumination.

Along the line of light determined by the illuminating means and the line of sight is located a suitable color filter. In the illustrated example the color filter 6 is located between the lamp 5 and the body 1.

This filter provides a contrast which makes it possible to better recognize the configuration of the flattened area. As is known, when examining the cornea, particularly when using a planing tonometer, a fluorescent liquid is used. This liquid is situated between the testing body and the cornea which is naturally moist. The use of such fluorescent material increases the contrast of the flattened area, which actually defines the boundary between light which passes through to the cornea and light which is reflected at the surface thereof. In this way, an improved observation of the area of contact is achieved.

Of course, the color filter can be located at any other location along the line of illumination or line of sight.

For example, it is possible to provide an illuminating means which in and of itself provides a filter by having a suitable blue-colored glass for its lamp, for example. According to another construction of the invention a blue filter may be centered directly into the holder 8 for the magnifying lens, and this latter type of construction has a certain advantage in that it will serve to soften any light which is directly reflected from the lamp at various surfaces of the instrument to the eye of the observer. Thus, this latter reflected light will be treated in the same way by the filter as the light which travels from the flattened area of contact to the eye of the observer. Thus, in this case, the extent to which the observed area can be precisely measured and seen is greatly increased, or in other words the ratio of the signal to the disturbances of the signal is rendered more favorable.

The lamp 5 is preferably in the form of a so-called lens lamp in that the lamp has at its front end a lens fused directly to the lamp for the purpose of concentrating the light in the desired direction.

However, the illuminating means can have as a light source not only a lamp which is assembled with the device but also according to another embodiment of the invention it is possible to provide light from an external light source, with this light being directed through light-conducting fibers of a light-conducting cable. The end of such a cable from which the light continues to travel is ground flat and polished and, if desired, may itself be provided with a suitable lens, and such an end of a light-conducting cable will be situated at a suitable location which may be the very same location shown in FIG. 1 for the lens for lamp 5.

According to a special embodiment which carries out the concept of the invention, the holding means 4 and lens holder 8 are removable from the primary component 9. Thus, these components may be interconnected, for example, through a bayonnet type of connection or through a cone type of frictional gripping connection. With such construction the primary component 9 is a conventional otoscope, which is used by and readily available to every practicing physician. Thus, with such a construction the purchase of a large fraction of the entire device can be avoided, and it becomes necessary only to purchase the testing body 1, the hold means 4, and the lens holder 8 with the magnifying lens 7. Because of the economic consideration set forth above, such an assembly is of particular importance.

However, even when using a primary component 9 specially built for the purpose of the structure of the invention, the connection thereof to the handle 20 can be formed in such a way that the battery-holding handle, which is conventionally used for an otoscope, and ophthalmoscope, and the like can be connected to the primary component 9, and, of course, such handles are readily available to and conventionally used by any practicing physician.

However, even when using a primary component 9 specially built for the purpose of the structure of the invention, the connection thereof to the handle 20 can be formed in such a way that the battery-holding handle, which is conventionally used for an otoscope, and ophthalmoscope, and the like can be connected to the primary component 9, and, of course, such handles are readily available to and conventionally used by any practicing physician.

In order to make it possible to provide an easy exchange of one lamp 5 for another, it is preferred to provide a holding means 4 which can be removed from the rest of the structure. When using an external light source, however, according to which a light-conducting cable directs the light into the instrument, this latter construction is not required.

In general it is sufficient to utilize a magnifying lens 7 without having any possibility of being focused to achieve a sharp image, since the normal accommodation capabilities of the user will at all times be adequate to enable the user to see a sharp image of the flattened area through the magnifying lens.

According to a special embodiment of the invention, however, it is proposed to mount the magnifying lens 7 adjustably in a suitable holder so that an accurate focusing adjustment is possible in accordance with any refraction errors which may present at the eye of the observer.

Furthermore, it is possible to provide with the invention an embodiment where instead of the lens 7 a telescope system having two or more lenses is used, such a system including an objective and an ocular lens. For this purpose it is possible to use either a Galileo or Kepler type of telescope in a simple construction or to use an objective and ocular with two or more lenses. Since even with a Kepler type of system a device for image reversal is not necessary, on of the other of the systems is well suited for the desired purposes. However, a Galileo telescope has the advantage of a shorter length.

In general, however, it is unnecessary to use a telescope system for the invention since the magnifying glass itself provides a sufficient degree of magnification.

According to the basic concept of the invention, the force with which the testing body 1 engages the cornea is determined by the weight of the testing body.

Thus, by making use of the above-mentioned ring 11 there is no problem in manufacturing the testing body with a predetermined weight to almost any desired degree of accuracy. However, in order to reliably provide a construction where the force which acts on the cornea is determined exclusively by the weight of the body, it is essential that no other forces act on the testing body, particularly friction forces. It is possible for friction forces to occur between the testing body 1 and the holding means 4.

In order to fulfill the requirement of the smallest possible friction, which is to say achievement of a force of friction so small that, as compared to the force with which the testing body presses on the cornea, the force of friction is negligible, a special construction of the invention is provided. Thus, the bore which is formed in the holding means 4 for the purpose of receiving and guiding the testing body 1, including the ring 11 thereof, is, as compared to the largest external diameter of the testing body, occurring at the exterior of the ring 11, so large that the testing body which rests on the cornea of the patient has a practically free movement in this guide. In other words, the holding means 4 has with respect to the testing body 1 a clearance sufficiently great to be entirely out of engagement with and spaced from the testing body when the latter rests on the cornea and has its axis extending vertically. Of course, it may happen that at any one spot or another there will be a slight contact between the exterior surface of the ring 11 and the interior surface of the bore of the holding means 4 in which the ring 11 is located. However, when the instrument is held so that the testing body 1 extends vertically the friction forces encountered between the testing body and its guide are on the order of a few tenth powers smaller than the force exerted by the weight of the testing body on the cornea. In order to maintain this latter negligible force of friction as small as possible, the exterior surface of the testing body, in particular at the exterior surface of the ring 11 thereof, and the inner surface of the holding means 4 which comes into engagement with the exterior surface of the ring 11 are both polished so that in this way there is an even further reduction in the force of friction which might occur. As is apparent from FIG. 1, the holding means 4 terminates at its bottom end in an inwardly directed shoulder situated beneath the bottom end surface of the ring 11 which is directed toward the bottom end surface 2 of the body 1. Beneath the ring 11, between the latter and the bottom end 2 of the body 1, this body 1 has an exterior surface which along the entire length from the ring 11 to the end 2 has a diameter less than that of the inwardly directed shoulder of the holding means 4, so that when the body 1 rests on an eye, the holding means 4 can be lowered without the possibility of engaging any obstructions.

Experience has shown that absolutely no difficulty is encountered in holding the device of the invention in such a way that the central axis of the testing body extends vertically within the holding means 4. However, a spacial embodiment can be provided where the primary component 9 or the holding means 4 has a device for indicating the vertical position thereof, such a device being in particular a small spirit level, for example, which when using the device has its image directed into the viewing field of the magnifying lens 7 so that it becomes possible to simultaneously observe the configuration of the flattened area and the level of the instrument. According to another embodiment it is possible to situate the spirit level at the exterior of the instrument, such as at the exterior side of the primary component 9, and then through a suitable reflector or prism arrangement it is possible in a known way to reflect the image of the level into the viewing field of the magnifying lens 7.

The upper end surface of the testing body 1 can be perpendicular to the central axis thereof, as is apparent in the embodiment of FIG. 1. However, in another embodiment which is shown in FIG. 2 the upper end surface of the plano parallel plate 10 which is made of transparent plastic or glass is situated at a suitable angle with respect to the axis of the testing body. Thus, the angle between the upper transparent plate of the testing body and the axis thereof is an angle different from a right angle. As a result of this construction light reflection which can occur with respect to the light which travels from the light source 5 to the upper end surface 3 of the testing body and which could disturb the observation because of its relatively great brightness is avoided. As a result of the inclination of the plate 10 the reflected light is not directed to the magnifying lens 7 or along the line of sight used by the observer but instead is absorbed by the inner surface of the instrument.

According to a further embodiment of the invention, the viewing field is divided into a pair of oppositely shifted halves by way of a pair of oppositely inclined plano parallel plates situated in the path of the light rays separated from each other only by a plane which contains the axis of the testing body 1, and made of a transparent material which has a refractive index greater than 1. In this way it is possible by a suitable selection of the refractive index in the material used in the manufacture of the plano parallel plates 12 and 13 and through a suitable selection of the angle of inclination thereof to situate the centers of both semicircles, into which the peripheral circle of the flattened area is divided, at a preselected distance from each other. If this displacement of these centers is equal to the diameter of the observed plane circle, then the second semicircle will directly engage and form a continuation of one end of the first semicircle, so that a S-shaped figure will result. On the other hand, if the observed diameter of the plane circle of contact is larger then the pair of semicircles will partly overlap along their diametral base lines, while in the event of a diameter smaller than the normal plane circle the displacement between the centers of the semicircles will be great enough to provide no common base for the pair of semicircles. These criteria for the magnitude of the plane circle serves with the invention not to measure the intraocular pressure but only to determine whether the tested pressure is above or below the proper pressure.

A similar arrangement is already known in German Pat. 1,113,285. However, in this latter patent use is not made of a pair of plano parallel plates which are oppositely inclined with respect to each other, but instead, as may be seen from claim 6 of this patent, use is only made of an inclined exit surface for the viewed area. This latter arrangement has with respect to the construction of the invention which utilizes a pair of plano parallel plates the disadvantage that chromatic aberrations occur as a result of the prism action, while with the use of plano parallel plates according to the invention such aberrations do not occur. The type of optical system used with the invention and similar optical systems for dividing the viewing field have been known for a long time and are used in photometers and similar devices. However, optical systems of this type have not been known in connection with a device of the type described above.

According to a further embodiment of the invention, the bottom end of the testing body is made up of a pair of transparent plates of glass or plastic which are glued or cemented to each other. Thus, referring to FIG. 2, it will be seen that at the bottom end of the body 1 shown in FIG. 2 there are a pair of plates 14 and 15 which are glued to each other at their adjoining surfaces. At the interface between these elements 14 and 15 it is possible to situate a scale or group of concentric circles. In this way it becomes possible to measure the diameter of the resulting plane circle. In connection, in particular, with an adjustable magnifying lens, as referred to above, it is possible to achieve a particularly good measurement of the diameter of the flattened area. If, in correspondence with the special purpose of the present invention in particular, it is desired to measure not the intraocular pressure but rather the limiting value beyond which the pressure should not extend in either direction, then in accordance with the invention an arrangement as shown in FIG. 3 may be provided.

Thus, referring to FIG. 3 the bottom end of the testing body is provided, for example, between the plates 14 and 15 or at the bottom surface of a single plate, with an indicating means taking the form of an inner circle 16 and an outer surrounding annular area 17. Both of these areas 16 and 17 are colored differently, so that, for example, the area 16 may be colored a light red while the area 17 may be colored a light green. In accordance with the invention the diameter of the inner circle 16 is selected in such a way that with the precisely determined weight of the testing body 1, the diameter of the flattened area of contact between the testing body and the cornea, or the average diameter of a flattened area whose configuration differs slightly from a circular configuration, should correspond with the diameter of the inner area 16 if the intraocular pressure corresponds to the magnitude of the normal intraocular pressure which forms a limiting value beyond which the intraocular pressure should not extend.

According to the basic concept of the invention, the flattened substantially circular area of contact between the cornea and the testing body will equal the diameter of the circular area 16 when the intraocular pressure is 28.5 grams/cm.² In accordance with a large number of tests it can in general be assumed that a pressure smaller than 28.5 grams/cm.² reliably indicates that there is in no case any possibility of glaucoma. Where the pressure is higher then one must take into consideration the possibility of the danger of occurrence of glaucoma.

With the above-described embodiment having the pair of plano parallel plates 12 and 13 which divide the viewing area, it is also possible to use an embodiment of the invention where the refraction index and inclination of the plates is selected in such a way that with the predetermined weight of the testing body 1 the pair of semicircles into which the viewing field is divided precisely engage each other at their ends to form the configuration of a complete circle when a normal intraocular pressure is encountered. A further improvement of this arrangement can be provided, however, by using for the plates 12 and 13 differently colored materials. For example, these plates 12 and 13 may be made of differently colored glass, so that it becomes possible to achieve an even clearer and better indicated difference between the positions of the semicircles.

We claim:

1. In a device for testing intraocular pressure by applanation, a testing body of a precise predetermined weight having a central axis in the region of which said body is transparent, said body terminating in a flat bottom end surface which is optically planar and which is adapted to rest upon the eye of a patient, holding means for holding and guiding said testing body and having with respect to said body a clearance sufficiently great to remain entirely out of engagement with said body when its axis is vertical and if inadvertently touching said body, engaging the latter only at a localized spot with a force of friction which is so small that it is negligible when compared with the force resulting from the weight of the testing body, said body having an upper end surface opposed to said bottom, optically planar end surface thereof, illuminating means for illuminating through the upper end surface of said testing body and through the testing body in the transparent region adjacent its axis the area of engagement between the bottom optically planar surface and the front cornea surface of the eye which is being tested, so that with said illuminating means it is possible to observe the peripheral configuration of the planed area resulting from resting of said testing body at said bottom, optically planar end surface thereof on the cornea, said area of engagement between said testing body and cornea being visible through said testing body when viewed along a given line of sight, magnifying means located along said line of sight for providing an enlarged image of the area of engagement between said testing body and cornea, and indicating means also located along said line of sight for indicating at least approximately the extent to which said plane area of engagement between said testing body and cornea deviates from a given value, said indicating means comprising, at said bottom end surface of said testing body, an inner circular area of a given radium and an outer surrounding annular area surrounding said circular area and having a color different therefrom, said testing body including a tubular casing having opposed open ends nonmetallic transparent optical elements closing said opposed ends of said tubular casing and defining the bottom and upper end surface of said testing body, and a ring surrounding and fixed to said tubular casing to provide the testing body with a precisely predetermined total weight, said ring having an outer peripheral surface directed toward said holding means and said holding means having a guide surface surrounding said outer surface of said ring with said clearance, said latter surfaces being smooth and polished to achieve a minimal friction if they should touch, said holding means terminating at its bottom end in an inwardly directed shoulder extending beneath said ring and said testing body having along its entire length between said ring and said bottom end surface a diameter which is less than the diameter of said shoulder and the outer surface of said body between said ring and bottom end surface thereof being free of any projections so that there are no obstructions between said ring and said bottom end of said testing body providing for free movement of said shoulder downwardly away from said ring without the possibility of engaging any obstructions.

2. In a device for testing intraocular pressure by applanation, a testing body of a precise predetermined weight having a central axis in the region of which said body is transparent, said body terminating in a flat bottom end surface which is optically planar and which is adapted to rest upon the eye of a patient, holding means for holding and guiding said testing body and having with respect to said body a clearance sufficiently great to remain entirely out of engagement with said body when its axis is vertical and if inadvertently touching said body, engaging the latter only at a localized spot with a force of friction which is so small that it is negligible when compared with the force resulting from the weight of the testing body, said body having an upper end surface opposed to said bottom, optically planar end surface thereof, illuminating means for illuminating through the upper end surface of said testing body and through the testing body in the transparent region adjacent its axis the area of engagement between the bottom optically planar surface and the front cornea surface of the eye which is being tested, so that with said illuminating means it is possible to observe the peripheral configuration of the planed area resulting from resting of said testing body at said bottom, optically planar end surface thereof on the cornea, said area of engagement between said testing body and cornea being visible through said testing body when viewed along a given line of sight, magnifying means located along said line of sight for providing an enlarged image of the area of engagement between said testing body and cornea, and indicating means also located along said line of sight for indicating at least approximately the extent to which said plane area of engagement between said testing body and cornea deviates from a given value, said testing body being hollow and said indicating means including within said body a pair of transparent, plano parallel oppositely inclined light-refracting plates separated only by a plane which contains said body axis and having a thickness and inclination which divide the viewed field into two halves which upon diviation of the intraocular pressure above or below a given value assume with respect to each other a position which indicates the deviation from a predetermined intraocular pressure.

3. The combination of claim 2 and wherein said pair of said plates respectively having different colors.